(12) United States Patent
Kito et al.

(10) Patent No.: US 6,491,994 B1
(45) Date of Patent: Dec. 10, 2002

(54) MULTI-LAYER FUEL TUBE

(75) Inventors: Satoshi Kito, Ube (JP); Shigetarou Miyano, Ube (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/549,696

(22) Filed: Apr. 14, 2000

(30) Foreign Application Priority Data

Apr. 16, 1999 (JP) .......................................... 11-108807

(51) Int. Cl.[7] .......................... B32B 27/20; B32B 27/34
(52) U.S. Cl. ................... 428/36.5; 428/36.91; 428/448; 428/454; 428/474.7; 428/474.9; 524/445
(58) Field of Search ....................... 524/445; 428/35.7, 428/36.5, 36.91, 448, 454, 474.7, 474.9

(56) References Cited

U.S. PATENT DOCUMENTS

| | | | |
|---|---|---|---|
| 4,881,576 A | * 11/1989 | Kitami et al. | 138/125 |
| 5,164,440 A | 11/1992 | Deguchi et al. | 524/444 |
| 5,248,720 A | * 9/1993 | Deguchi et al. | 524/444 |
| 5,469,892 A | * 11/1995 | Noone et al. | 138/121 |
| 6,267,148 B1 | * 7/2001 | Katayama et al. | 138/137 |

FOREIGN PATENT DOCUMENTS

| | | |
|---|---|---|
| EP | 0 010 751 A1 | 5/1980 |
| EP | 0 358 415 A1 | 3/1990 |
| EP | 0 810 259 A1 | 12/1997 |
| EP | 0 888 880 A1 | 1/1999 |
| JP | A-5-293916 | 11/1993 |

OTHER PUBLICATIONS

Hackh's Chemical Dictionary, 1944, 3rd edition, p. 664.*

* cited by examiner

Primary Examiner—Sandra M. Nolan
(74) Attorney, Agent, or Firm—Morgan, Lewis & Bockius LLP

(57) ABSTRACT

A multi-layer fuel tube comprising at least three thermoplastic resin layers, said at least three thermoplastic resin layers comprising (A) a layer of polyamide 11 resin and/or polyamide 12 resin, (B) layer of polyamide 6, and (C) a layer of polyamide containing 0.05 to 30% by weight of a layered silicate uniformly dispersed therein.

20 Claims, 1 Drawing Sheet

MULTI-LAYER FUEL TUBE

BACKGROUND OF THE INVENTION

1. Field of the Invention

Figure 1:
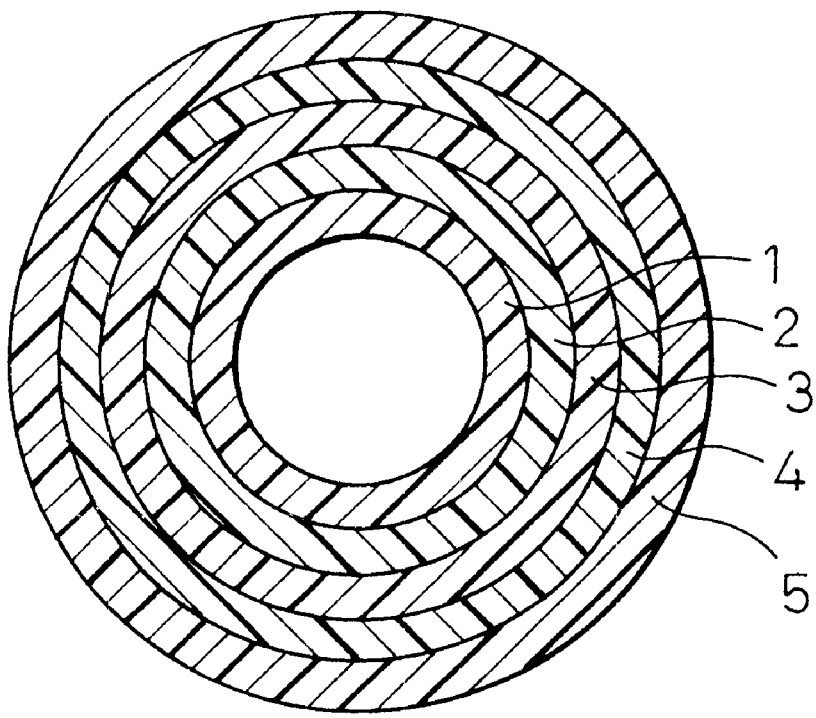

The present invention relates to a multi-layer fuel tube which allows little permeation of an alcohol/gasoline mixed fuel or the like through the tube wall, is excellent in properties including impact resistance, and is particularly suitable for a multi-layer fuel tube used in an automobile.

2. The Description of the Related Art

Fuel tubes conventionally used for automobiles are made of a metal or a resin. However, substitution of resin tubes for metal tubes is recently being investigated in order to solve the problem of corrosion by anti-freezing agents and in order to respond to the requests for reducing the weight of automobile bodies for the purpose of improving fuel efficiency.

Resin tubes, however, allow considerable permeation of fuel through the tube walls in comparison with the metal tubes. Particularly, conventional tubes of polyamide 11 resin or polyamide 12 resin allow permeation by alcohols. To use such a resin fuel tube for an alcohol/gasoline mixed fuel, the thickness of the tube must be increased, which disadvantageously results in reducing the flexibility of the tube and increasing the weight and the cost of the material and, thus, decreased productivity. Also, resin tubes do not have suitable properties, including the impact resistance at low temperatures and stiffness, to be used under severe conditions as automobile fuel tubes.

To solve the above problems, Japanese Unexamined Patent Publication (Kokai) No. 5-293916 proposes a multi-layer tube, for fuels, which comprises a polyamide resin containing 1.5 to 10% by weight of a layered silicate uniformly dispersed therein. However, this fuel tube of a resin composition still does not sufficiently prevent permeation of an alcohol/gasoline mixed fuel through the tube walls.

The object of the present invention is to solve the problems of the prior art, that is, to provide a multi-layer fuel tube which can significantly reduce or prevent the permeation of an alcohol/gasoline mixed fuel through the tube walls and has excellent properties such as the impact resistance at low temperatures and stiffness.

SUMMARY OF THE INVENTION

The present invention resides in a multi-layer fuel tube comprising at least three thermoplastic resin layers, said at least three thermoplastic resin layers comprising (A) a layer of polyamide 11 resin and/or polyamide 12 resin, (B) a layer of polyamide 6, and (C) a layer of polyamide containing 0.05 to 30% by weight of a layered silicate uniformly dispersed therein.

BRIEF DESCRIPTIONS OF THE DRAWINGS

FIG. 1 is a cross-sectional view of a multi-layer fuel tube of the present invention.

DETAILED DESCRIPTIONS OF THE INVENTION

The polyamide 11 resin of the layer (A) used in the present invention is typically a polyamide, having an acid-amide bond: (—CONH—) and represented by the formula: (—CO—$(CH_2)_{10}$—NH—)$_n$, and can be produced by polymerization of 11-aminoundecanoic acid or un-decanelactam.

The polyamide 12 resin of the layer (A) used in the present invention is typically a polyamide, having an acid-amide bond: (—CONH—) and represented by the formula: (—CO—$(CH_2)_{11}$—NH—)$_n$, and can be produced by polymerization of 12-aminododecanoic acid or dodecanelactam.

The polyamide 11 resin and polyamide 12 resin of the layer (A) may be a copolymer using the above monomers as the main component, that is, in an amount of at least 50% by weight.

The other monomers used in the copolymers of the polyamide 11 resin and polyamide 12 resin may be, for example, ε-caprolactam, 6-aminocaproic acid, ε-enantholactam, 7-aminoheptanoic acid, α-pyrroridone and α-piperidone, as well as any combinations of a diamine such as hexamethylenediamine, nonamethylenediamine, undecamethylenediamine and dodecamethylenediamine with a dicarboxylic acid such as terephthalic acid, isophthalic acid, adipic acid and sebacic acid. Also, the copolymer may be a copolymer between the polyamide 11 resin and the polyamide 12 resin.

The layer (A) of the present invention may be a blend of the polyamide 11 resin and polyamide 12 resin, as the main component, with other polyamide resins or other polymers. The content of the polyamide 11 resin and/or polyamide 12 resin in the blend is preferably 40% by weight or more.

The other polyamide resins used in the above blend include polyamide 6, polyamide 66, polyamide 610, polyamide 612, polyamide 1212, polyamide 6/66 copolymer, and polyamide 6/12 copolymer. The other polymers used in the above blend include polypropylene, acrylonitrile-butadiene-styrene (ABS) copolymer resin, polyphenylene oxide, polycarbonate, polyethylene terephthalate, and polybutylene terephthalate.

The layer (A) may contain a plasticizer. The plasticizer may be, for example, butyl benzenesulphonamide, and esters of p-hydroxybenzoic acid and a linear or branched alcohol having 6 to 21 carbon atoms, for example, 2-ethylhexyl p-hydroxybenzoate.

The amount of the plasticizer may be in a range of 0 to 30 parts by weight, preferably 0 to 15 parts by weight, based on 100 parts of the resin of the layer (A). If the content of the plasticizer exceeds 30 parts by weight, the burst pressure of the tube decreases and there is a problem of bleed out, which is not preferred.

The layer (A) may contain an impact modifier. The impact modifier may be, for example, ionomers, ethylene-propylene copolymers, ethylene-propylene-including terpolymers, polystyrenes-polyethylenebutylene block copolymers, polystyrene-hydrogenated polyisoprene block copolymers, ethyleneoctene rubbers or other rubbers, elastomers, or the modified compounds thereof, or combinations thereof.

The amount of the impact modifier may be in a range of 0 to 20 parts by weight, preferably 0 to 10 parts by weight, based on 100 parts of the resin. If the content of the impact modifier exceeds 20 parts by weight, the burst pressure of the tube decreases and there is a problem with weatherability, which is not preferred.

The layer (A) of the polyamide 11 resin and/or polyamide 12 resin is used as at least one layer of the multi-layer tube of the present invention. The layer (A) is preferably used as the outermost layer of the multi-layer tube. If the layer (A) of the polyamide 11 resin and/or polyamide 12 resin is not used, the resin of the tube is deteriorated by anti-freezing agents in the roads.

The thickness of the layer (A) depends on the number of the layers, but is preferably in a range of 3 to 90% of the wall thickness of the tube. If the thickness of the layer (A) is too large, the thickness of the polyamide layer (C) containing 0.05 to 30% by weight of a layered silicate dispersed therein becomes thin and the fuel permeation increases, which is not preferred. If the thickness of the layer (A) is too small, the effect of increasing the resistance against anti-freezing agents is not sufficient.

The polyamide 6 resin of the layer (B) used in the present invention is typically a polyamide, having an acid-amide bond: (—CONH—) and represented by the formula: (—CO—(CH$_2$)$_5$—NH—)$_n$, and can be produced by polymerization of ε-caprolactam or 6-aminocaproic acid.

The polyamide 6 resin of the layer (B) may be a copolymer using the above monomers as the main component, that is, at least 50% by weight.

The other monomers used in the copolymers of the polyamide 6 resin may be ε-enantholactam, 7-aminoheptanoic acid, 11-aminoundecanoic acid, undecanolactam, 12-aminododecanoic acid, dodecanolactam, α-pyrroridone and α-piperidone, as well as any combinations of a diamine such as hexamethylenediamine, nonamethylenediamine, undecamethylenediamine and dodecamethylenediamine with a dicarboxylic acid such as terephthalic acid, isophthalic acid, adipic acid and sebacic acid.

The layer (B) of the present invention may be a blend of the polyamide 6 resin, as the main component, with other polyamide resins or other polymers. The content of the polyamide 6 resin in the blend is preferably 50% by weight or more.

The other polyamide resins used in the above blend include polyamide 11, polyamide 12, polyamide 66, polyamide 6–10, polyamide 612, polyamide 1212, polyamide 6/66 copolymer, and polyamide 6/12 copolymer. The other polymers used in the above blend include polypropylene, acrylonitrile-butadiene-styrene copolymer resin (ABS resin), polyphenylene oxide, polycarbonate, polyethylene terephthalate, and polybutylene terephthalate.

The layer (B) may contain a plasticizer. The plasticizer may be, for example, butyl benzenesulphonamide, and esters of p-hydroxybenzoic acid and a linear or branched alcohol having 6 to 21 carbon atoms, for example, 2-ethylhexyl p-hydroxybenzoate.

The amount of the plasticizer may be in a range of 0 to 30 parts by weight, preferably 0 to 15 parts by weight, based on 100 parts of the resin. If the content of the plasticizer exceeds 30 parts by weight, the burst pressure of the tube decreases and there is a problem of bleed out, which is not preferred.

The layer (B) may contain an impact modifier. The impact modifier may be, for example, ionomers, ethylene-propylene copolymers, ethylene-propylene-containing terpolymers, polystyrenes-polyethylenebutylene block copolymers, polystyrene-hydrogenated polyisoprene block copolymers, ethyleneoctene rubbers or other rubbers, elastomers, or the modifications thereof, or combinations thereof.

The amount of the impact modifier may be in a range of 0 to 35 parts by weight, preferably 10 to 20 parts by weight, based on 100 parts of the resin. If the content of the impact modifier exceeds 35 parts by weight, the burst pressure of the tube decreases, which is not preferred.

The layer (B) may contain conductive carbon black. By incorporating the conductive carbon black, the resin becomes conductive so that an explosion due to electrostatic charges can be prevented. The layer containing conductive carbon black may be provided at any layer of the multi-layer tube, but is preferably located as the innermost layer. The conductive carbon black used is preferably one having an excellent chain structure and a large agglomerate density and acetylene black and ketjenblack may be mentioned. The amount of the conductive carbon black is preferably in a range of 3 to 30% by weight of the layer.

The layer (B) of the polyamide 6 resin is used as at least one layer of the multi-layer tube of the present invention. The layer (B) is preferably used as the innermost layer of the multi-layer tube. If the layer (B) of the polyamide 6 resin is not used, the impact resistance at low temperatures of the tube is low.

The thickness of the layer (B) depends on the number of the layers, but is preferably in a range of 3 to 90% of the wall thickness of the tube. If the thickness of the layer (B) is too large, the thickness of the polyamide layer (C) containing 0.05 to 30% by weight of a layered silicate dispersed therein becomes thin, and if the thickness of the layer (B) is too small, the impact resistance at low temperatures of the tube decreases, which is not preferred.

The polyamide resin of the layer (C), containing 0.05 to 30 % by weight of a layered silicate uniformly dispersed therein, used in the present invention is a polymer having an acid-amide bond: (—CONH—) in its molecule, and can be, for example, polymers and copolymers obtained from ε-caprolactam, 6-aminocaproic acid, ω-enantholactam, 7-aminoheptanoic acid, 11-aminoundecanoic acid, 9-aminononanoic acid, α-pyrrolidone and α-piperidone, and polymers or copolymers obtained by condensation polymerization of diamines such as hexamethylenediamine, nonamethylenediamine, undecamethylenediamine, dodecamethylenediamine and metaxylenediamine, and dicarboxylic acids such as terephthalic acid, isophthalic acid, adipic acid and sebacic acid, and blends of the above.

Preferably, the polyamide resin of the layer (C) is polyamide 6, polyamide 66 and polyamide 6/66 copolymer. In the case of the polyamide 6/66 copolymer, the ratio between the polyamide 6/66 units or monomers may be any in a range of 95/5 to 5/95% by weight.

The layered silicate to be used in the polyamide resin layer (C) may be, for example, layered phyllosilicate minerals constituted of layers of magnesium silicate or aluminum silicate. Specifically, there can be included smectite type clay minerals such as montmorillonite, saponite, beidellite, nontronite, hectorite, stevensite, etc. and vermiculite, halloysite, etc., and these can be either natural or synthetic. Among these, montmorillonite is preferred.

The layered silicate which is uniformly dispersed in the polyamide resin layer (C) is characterized in that layered silicate having one size of 0.002 to 1 μm and a thickness of 0.6 to 2.0 nm is uniformly dispersed and has an interlayer distances of 2.0 nm or more on the average. Here, the interlayer distance refers to the distance between the gravity centers of flat plates of the layered silicate, and uniform dispersion refers to the dispersed state in which each one sheet of the layered silicate or a multilayer of 5 layers or less on an average exists in parallel or randomly, or under the state where parallel and random states exist in mixture, with 50% or more, preferably 70% or more, thereof forming no local mass.

When the layered silicate used is a multi-layer clay mineral, the clay silicate may be previously contacted with a swelling agent, including an amine such as dioctadecylamine and phenylenediamine, an amino acid such as 4-amino-n-butylic acid and 12-aminododecanoic acid, and a lactam such as ε-caprolactam, to increase the distance between the layers of the clay mineral, before the polymerization, so that, during the polymerization, incorporation of the monomer of polyamide resin between the layers is accelerated and, therefore, the layered silicate having a smaller number layers can be uniformly dispersed in the polymerized resin. Alternatively, the layered silicate may be previously swelled by a swelling agent to have a layer distance of, for example, about 2.0 nm or more, and the thus swelled silicate may be then mixed and fused with the polyamide-containing resin.

The amount of the layered silicate may be in a range of 0.05 to 30 parts by weight, preferably 1 to 10 parts by weight, more preferably 1.5 to 5 parts by weight, based on 100 part by weight of the resin of the layer (C). If the amount of the layered silicate is less than 0.05 parts by weight, the effect of preventing the fuel permeation lowers. If the amount of the layered silicate is more than 30 parts by weight, the shaping of a multi-layer tube becomes difficult even if the thickness of the tube is made thin, and the impact resistance at low temperatures and elongation decrease to such a degree that they do not satisfy the requirements of the tube for an automobile. This is not preferred.

The thickness of the layer (C) depends on the number of the layers, but is preferably in a range of 3 to 90%, more preferably 5 to 80%, particularly 20 to 50%, of the wall thickness of the tube. If the thickness of the layer (C) exceeds 90%, the stiffness and the impact resistance at low temperatures are lowered. If the thickness of the layer (C) is less than 3%, the effect of preventing fuel permeation is lowered.

The number of the layers of the multi-layer fuel tube of the present invention is at least three, but is preferably not more than 7 layers, more preferably 3 to 6 layers, further preferably 4 or 5 layers, considering the mechanism of a tube manufacturing apparatus.

In addition to the layers (A), (B) and (C) as described above, one or more layers of other thermoplastic resins can be provided in the multi-layer fuel tube of the present invention. Such other thermoplastic resins are not particularly limited as long as they are thermoplastic resins which can adhere with the polyamide 11 resin and/or polyamide 12 resin, the polyamide 6 resin and the polyamide 6/66 copolymer resin, directly, or indirectly by means of an adhering resin which can adhere with the polyamide 11 resin and/or polyamide 12 resin, the polyamide 6 resin and the polyamide 6/66 copolymer resin.

The other thermoplastic resins which can be used in the present invention include polystyrene resins, polyolefin resins, polyurethane resins, polyester resins, polyamide resins, 1,2-polybutadiene-based resins, vinyl chloride-based resins, fluorine-containing resins, polyoxiymethylene-based resins and polyphenylene sulfide-based resins. Among them, polyolefin resins, polyester resins, polyamide resins and polyphenylene sulfide-based resins are preferable, and the polyolefin resins are the most preferable.

Examples of the polyolefin resins include polyethylene, polypropylene and copolymers thereof. Also, modified polymers of these polymers may be used. Particularly when polyethylene or polypropylene is used in combination with the polyamide resin of the present invention, it is preferred that those which are modified with maleic anhydride or glycidyl group-containing monomers are used.

Examples of the polyester resins are polyethylene terephthalate and polybutylene terephthalate.

An example of a polyphenylene sulfide-based resin is polyphenylene sulfide.

Examples of the polyamide resins are lactam polymers such as polycaprolactam and polylaurolactam; aminocarboxylic acid polymerization condensates of 6-aminocapric acid, 11-aminoundecanoic acid and 12-aminododecanoic acid; polymerization condensates between alkylene diamine and dicarboxylic acid, such as polyhexamethylene adipamide, polyhexamethylenedodecamide and polyhexamethyleneterephthalamide; and semi-aromatic polyamides such as hexamethylene adipamide/hexamethyleneterephthalamide copolymer and hexamethylene adipamide/hexamethyl eneisophthalamide copolymer, and are not particularly limited.

The thickness of the layers of the other thermoplastic resins depends on the number of the layers of the multi-layer tube, but is preferably in a range of 3 to 90% of the total thickness of the tube. The location of the layers of the other thermoplastic resins is usually in the intermediate position of the tube, i.e., not the outermost or innermost layer.

The diameter of the multi-layer fuel tube is determined considering the flow rate of a fuel such as gasoline. The wall thickness is selected such that the permeation of the gasoline does not increase, the pressure resistance usually required for a tube is provided or maintained, and the tube has a sufficient flexibility to allow easy assembly of the tube and to give a sufficient resistance to vibration in use. Although these are not particularly limited, typically, the outer diameter is in a range of 4 to 15 mm and the wall thickness is in a range of 0.5 to 2 mm.

In manufacturing a multi-layer fuel tube of the present invention, for example, a so-called co-extrusion may be used, i.e., a number of resins are fused and extruded using the number of extruders corresponding the number of the layers or materials of the tube into a die for a multi-layer tube, and the resins in the form of layers passing through the die or just after leaving the die are laminated and adhered to each other, after which a multi-layer fuel tube is manufactured in the same manner as in a usual tube formation. In an alternative method, once a single layer tube is formed, another resin layer is formed on the tube by coating.

The shape of the tube may be a straight tube or in the form of bellows.

In the case of the straight tube, a protecting layer may be provided on the outside thereof. The material of the protecting layer may be, for example, chloropyrene, ethylene-propylene-diene terpolymer, epichlorohydrine rubber, chlorinated polyethylene, acrylic rubber, chlorosulphonated polyethylene, silicone rubber and the other rubbers.

The multi-layer fuel tube of the present invention can be suitably used as a tube in which alcohol and/or gasoline are used as a fuel. Specifically, such a tube is a fuel tube for a generator or a fuel tube for an automobile. The multi-layer fuel tube of the present invention is particularly suitable for a fuel tube for an automobile.

EXAMPLES

The present invention will be more fully described with reference to the following examples, but it is not limited thereto.

The evaluations of the properties or characteristics were made as below:
(Impact resistance at low temperatures)
The evaluation was made in accordance with SAE J2260
(Distribution of layered silicate)
A polyamide resin containing a layered silicate was sliced and observed by a transmission electron microscope.

(Layer distance of layered silicate)

It was determined by an X-ray diffraction of a polyamide resin containing a layered silicate.

(Permeation of fuel)

In a tube having a length of 200 mm and sealed at an end thereof, an alcohol/gasoline mixture of 85 parts by weight of Fuel C (an isooctane/toluene mixture at 50/50 parts-by-weight ratio) and 15 parts by weight of methyl alcohol was charged, and the other end of the tube was then sealed. After the weight of the tube was measured, the tube was placed in an oven heated to 60° C. and the change in the weight of the tube was measured to evaluate the permeation of the fuel through the tube.

Example 1

100 g of montmorillonite having an average thickness of the silicate layer unit of 0.95 nm and a size of about 0.1 μm was dispersed in 10 liter of water, to which 51.2 g of 12-aminododecanoic acid and 24 ml of a concentrated hydrochloric acid were added. The mixture was stirred for 5 minutes, and dried under vacuum to obtain a composite of ammonium 12-aminododecanoate ions and montmorillonite. The layer distance of the layered silicate particles (the weight center distance of the particles) in the obtained composite was measured by an X-ray diffraction to be 1.8 nm.

10 kg of ε-caprolactam, 1 liter of water and 230 g of the above composite were charged in a reactor having stirring wings and stirred at 100° C. until the reaction system in the reactor became uniform.

The temperature in the reactor was raised to 290° C. and the reaction system in the reactor was stirred under a pressure of 43 kg/cm$^2$ for more than 1 hour. After the pressure was released, the reaction was continued under atmospheric pressure for 3 hours while water was being evaporated. After the reaction was completed, the reaction product was taken out through a nozzle at the bottom of the reactor in the form of a strand into water for cooling. The cooled strand was cut into pellets comprising polyamide 6 resin having an average molecular weight of 22,000 and montmorillonite. The pellets were dried under vacuum to obtain a composition to be used for the inner layer of a multi-layer tube. This composition contained the layered silicate in an amount of 1.8% by weight and is referred to as "Composition 1" below.

Separately, polyamide 12 resin containing a plasticizer and an impact modifier (Ube Industries, UBESTA 3035MJ1) was prepared as an outer layer composition; polyamide 6 resin containing a plasticizer and an impact modifier (Ube Industries, UBE Nylon 1024J1) was prepared as an innermost layer composition; and a modified polyolefin resin (Ube Industries, UBE U-bond F1100) was prepared as an intermediate layer composition.

The apparatus used for producing a multi-layer tube comprised four extruders, including an extruder for the innermost layer, an extruder for an inner layer, an extruder for an intermediate layer and an extruder for an outer layer; an adaptor for collecting resins extruded from the four extruders; a die for forming the resins into the form of a tube; a sizing die for cooling and controlling the size of the tube; and a tube-winding machine. The polyamide 6 resin was introduced into a hopper of the extruder for the innermost layer; the Composition 1 to be used as a barrier layer was introduced into a hopper of the extruder for an inner layer; the modified polyolefin resin was introduced into a hopper of the extruder for an intermediate layer; and the polyamide 12 resin was introduced into a hopper of the extruder for an outer layer, to form a multi-layer tube having a cross-section as shown in FIG. 2 and having an inner diameter of 6 mm and an outer diameter of 8 mm. The thickness of the innermost layer was 0.3 mm, the thickness of the inner layer was 0.25 mm, the thickness of the intermediate layer was 0.1 mm, and the thickness of the outer layer was 0.35 mm.

The properties of the obtained tube were evaluated and the results are shown in Table 1.

Example 2

The same composition as Composition 1 was prepared in the same manner as in Example 1, except that the polyamide 6 resin was replaced by polyamide 6/66 copolymer resin having a copolymerization ratio of 80/20 and having a 98%-sulfuric acid relative viscosity of 4.4 measured by JIS K 6810. This composition is referred to as Composition 2.

The same procedures as in Example 1 were repeated, except that Composition 1 for the inner layer was replaced by Composition 2, to produce a multi-layer tube and the properties of the tube were evaluated.

The results are shown in Table 1.

Example 3

The same procedures as in Example 1 were repeated, except that the innermost layer was made of polyamide 6 resin containing an impact modifier (Ube Industries, UBE Nylon 1018I), to produce a multi-layer tube and the properties of the tube were evaluated.

The results are shown in Table 1.

Example 4

The same procedures as in Example 2 were repeated, except that the innermost layer was made of polyamide 12 resin (Ube Industries, UBESTA 3030LUX), to produce a multi-layer tube and the properties of the tube were evaluated.

The results are shown in Table 1.

Example 5

The same procedures as in Example 2 were repeated, except that the innermost layer was made of polyamide 6 resin containing 8% by weight of conductive carbon black (Lion K. K., Ketjenblack EC-600JD), to produce a multi-layer tube and the properties of the tube were evaluated.

The results are shown in Table 1. The above polyamide 6 resin containing 8% by weight of conductive carbon black is referred to as Composition 3.

Example 6

The same procedures as in Example 2 were repeated, except that a layer of the modified polyolefin resin was further inserted between the inner layer and the innermost layer, in addition to between the inner layer and the outermost layer, by changing the die to an appropriate one, to produce a five-layer tube using the four resin compositions.

The five-layer tube comprised, from the outermost to innermost layers, a layer of the polyamide 12 resin containing a plasticizer and an impact modifier (Ube Industries, UBESTA 3035MJ1), a layer of the modified polyolefin resin (Ube Industries, UBE U-bond F1100), a layer of the Composition 2, a layer of the modified polyolefin resin (Ube Industries, UBE U-bond F1100), a layer of the polyamide 6 resin containing a plasticizer and an impact modifier (Ube Industries, UBE Nylon 1024J1). The thicknesses of the layers were, from the outermost to innermost layers, 0.35 mm, 0.05 mm, 0.25 mm, 0.05 mm and 0.30 mm, respectively.

The properties of the obtained tube were evaluated. The results are shown in Table 1.

Example 7

The same procedures as in Example 2 were repeated, except that a layer of Composition 3 was added to further inside of the multi-layer tube of Example 2, by changing the die to an appropriate one, to produce a five-layer tube using the five resin compositions. The thicknesses of the five layers were 0.35 mm, 0.10 mm, 0.25 mm, 0.25 mm and 0.05 mm, respectively, from the outermost to innermost layers.

The properties of the obtained tube were evaluated. The results are shown in Table 1.

Comparative Example 1

The same composition as Composition 1 was prepared in the same manner as in Example 1, except that the polyamide 6 resin used was replaced by polyamide 12 resin having an average molecular weight of 35,000. This composition is referred to as Composition 4.

The same procedures as in Example 1 were repeated, except that Composition 4 was used to form the innermost layer, the polyamide 12 resin (Ube Industries, UBESTA 3035MJ1) was used to form the inner layer, the intermediate layer and the outer layer, to produce a multi-layer tube, and the properties of the tube were evaluated. The thickness of the innermost layer was 0.3 mm and the total thickness of the inner, intermediate and outer layers was 0.7 mm.

The results are shown in Table 1.

Comparative Example 2

The same procedures as in Example 1 were repeated to produce a multi-layer tube, except that Composition 1 was used to form the innermost layer, the modified polyolefin resin (Ube Industries, U-bond F1100) was used to form the inner layer, and the polyamide 12 resin (Ube Industries, UBESTA 3035MJ1) was used to form the intermediate layer and the outer layer. The thickness of the innermost layer was 0.3 mm, that of the inner layer was 0.1 mm and the total thickness of the intermediate and outer layers was 0.6 mm.

The properties of the tube were evaluated. The results are shown in Table 1.

Comparative Example 3

The same procedures as in Comparative Example 2 were repeated to produce a multi-layer tube, except that the polyamide 6 resin containing a plasticizer and an impact modifier (Ube Industries, UBE Nylon 1024J1) was used to form the innermost layer.

The properties of the tube were evaluated.

TABLE 1

| Tube | Impact resistance at low temperatures (number of broken tubes/ number of tested tubes) | Fuel permeation (g/24 hours) |
| --- | --- | --- |
| Ex. 1 | 0/10 | 0.24 |
| Ex. 2 | 0/10 | 0.23 |
| Ex. 3 | 0/10 | 0.22 |
| Ex. 4 | 0/10 | 0.21 |
| Ex. 5 | 0/10 | 0.25 |
| Ex. 6 | 0/10 | 0.23 |
| Ex. 7 | 0/10 | 0.25 |
| Com. Ex. 1 | 0/10 | 0.55 |
| Com. Ex. 2 | 10/10 | 0.25 |
| Com. Ex. 3 | 0/10 | 0.75 |

What is claimed is:

1. A multi-layer fuel tube comprising at least three thermoplastic resin layers, comprising:
   (A) an outermost layer comprising polyamide 11 resin and/or polyamide 12 resin;
   (B) an innermost layer comprising polyamide 6 resin, the content of the polyamide resin in said innermost layer being 50% by weight or more; and
   (C) an intermediate layer comprising polyamide containing 0.05 to 30% by weight of a layered silicate uniformly dispersed therein.

2. The multi-layer fuel tube according to claim 1, wherein said layer (C) comprises polyamide 6 resin and/or polyamide 6/66 copolymer resin.

3. The multi-layer fuel tube according to claim 1, wherein the innermost layer of said multi-layer fuel tube is a layer of a conductive resin.

4. The multi-layer fuel tube according to claim 1, wherein said layered silicate has a size of 0.002 to 1 $\mu$m and is uniformly dispersed in said layer (C) such that said layered silicate having not more than 5 layers is present in an amount of 50% by weight or more of the total of the layered silicate.

5. The multi-layer fuel tube according to claim 4, wherein said layered silicate having not more than 5 layers is present in an amount of 70% by weight or more of the total of the layered silicate.

6. The multi-layer fuel tube according to claim 1, wherein the particles of said layered silicate are spaced with each other at an average weight center distance of 2 nm or more.

7. The multi-layer fuel tube according to claim 1, wherein said layered silicate in said layer (C) is essentially of layered silicate having not more than 5 layers.

8. The multi-layer fuel tube according to claim 1, wherein said layered silicate is a phyllosilicate.

9. The multi-layer fuel tube according to claim 8, wherein said layered silicate is montmorillonite.

10. The multi-layer fuel tube according to any one of claim 9, which is a multi-layer fuel tube for an automobile.

11. The multi-layer fuel tube according to claim 1, wherein said multi-layer fuel tube has a corrugate form.

12. The multi-layer fuel tube according to claim 1 which is a multi-layer fuel tube for an automobile.

13. The multi-layer fuel tube according to claim 2 which is a multi-layer fuel tube for an automobile.

14. The multi-layer fuel tube according to claim 3 which is a multi-layer fuel tube for an automobile.

15. The multi-layer fuel tube according to claim 4 which is a multi-layer fuel tube for an automobile.

16. The multi-layer fuel tube according to claim 5 which is a multi-layer fuel tube for an automobile.

17. The multi-layer fuel tube according to claim 6 which is a multi-layer fuel tube for an automobile.

18. The multi-layer fuel tube according to claim 7 which is a multi-layer fuel tube for an automobile.

19. The multi-layer fuel tube according to claim 8 which is a multi-layer fuel tube for an automobile.

20. The multi-layer fuel tube according to claim 9 which is a multi-layer fuel tube for an automobile.

* * * * *